United States Patent [19]

Aonuma et al.

[11] Patent Number: 4,959,263

[45] Date of Patent: Sep. 25, 1990

[54] MAGNETIC RECORDING MEDIUM

[75] Inventors: Masashi Aonuma; Tsutomu Okita; Hiroshi Hashimoto; Hiroaki Araki; Kiyotaka Fukino; Kiyomi Ejiri, all of Kanagawa, Japan

[73] Assignee: Fuji Photo Film Co., Ltd., Kanagawa, Japan

[21] Appl. No.: 195,224

[22] Filed: May 18, 1988

[30] Foreign Application Priority Data

May 18, 1987 [JP] Japan .................... 62-120549
Jul. 20, 1987 [JP] Japan .................... 62-179141

[51] Int. Cl.$^5$ .................................... G11B 23/00
[52] U.S. Cl. ............................ 428/329; 428/694; 428/900
[58] Field of Search ............... 428/403, 694, 900, 329

[56] References Cited

U.S. PATENT DOCUMENTS 4,631,140 12/1986 Stock et al. .................. 428/694
4,713,293 12/1987 Asano et al. ................. 428/694
4,791,021 12/1988 Honda et al. ................. 428/694

Primary Examiner—Paul J. Thibodeau
Attorney, Agent, or Firm—Sughrue, Mion, Zinn, Macpeak & Seas

[57] ABSTRACT

A magnetic recording medium is described, comprising a nonmagnetic support having thereon a magnetic layer containing a binder which is cross-linkable or polymerizable by radiation irradiation and ferromagnetic particles, the ferromagnetic particles being metal or metal alloy particles mainly comprising iron having a crystal size of 300 Å or less, having an atomic ratio of oxygen atoms to iron atoms of from 1.6 to 3.0 on the surface of the particles, and the magnetic layer having been irradiated with radiation, and comprising a nonmagnetic support having thereon a magnetic layer containing a binder comprising thermoplastic resins, thermosetting resins, reactive type resins and mixtures thereof and ferromagnetic particles, said ferromagnetic particles being metal or metal alloy particles mainly comprising iron having a crystal size of 250 Å or less, and having an atomic ratio of oxygen atoms to iron atoms of from 1.6 to 3.0 on the surface of said particles.

5 Claims, No Drawings

MAGNETIC RECORDING MEDIUM

FIELD OF THE INVENTION

The present invention relates to a magnetic recording medium such as a video tape, an audio tape or a computer tape, and more particularly, it relates to a magnetic recording medium having improved electromagnetic properties such as C/N and reduced demagnetization at high temperatures and high humidity.

BACKGROUND OF THE INVENTION

A magnetic recording medium generally and widely used these, days uses as a binder thermoplastic resins alone or in combination such as vinyl chloride and vinyl acetate type resins, vinyl chloride and vinylidene chloride resins, cellulose type resins, acetal resins, urethane resins or acrylonitrile butadiene resins. When these resina are used as a binder, there are such defects that the wear resistance of the magnetic layer is poor and that the running systems of magnetic tapes are readily stained.

It is known in Japanese Patent Application (OPI) Nos. 222433/83 and 101625/81 (the term "OPI" as used herein refers to a "published unexamined Japanese patent application") and U.S. Pat. No. 4,492,735 that thermosetting resins such as melamine resins or urea resins are used as a binder and that a binder which is crosslinked by a chemical reaction such as an isocyanate compound or an epoxy compound can be added to the above described thermoplastic resins. However, when such a crosslinkable binder is used, there are also defects in that: (1) storage stability of the coating composition composed of ferromagnetic particles dispersed therein and resins is poor, that is, pot life is short, and uniformity of the magnetic coating composition as well as that of the magnetic tape cannot be maintained, and (2) after the magnetic coating composition is coated and dried, a heat treatment for hardening the coated film is necessary and a long period of time for manufacturing the magnetic recording medium is necessary.

In order to avoid the above defects, a method for preparing a magnetic recording medium using as a binder an oligomer and monomer of an acrylic acid ester type and hardening them by electron beam radiation after drying has been suggested and is disclosed in Japanese Patent Publication No. 12423/72, Japanese Patent Application (OPI) Nos. 13639/72, 15104/72, 77433/75 and 25231/81. However, a magnetic recording medium having satisfactory electromagnetic properties and durability could still not be obtained in accordance with the above described method.

As a magnetic composition for a magnetic recording medium, ferromagnetic metal particles or metal alloy particles mainly composed of Fe, Ni, Co and the like have begun to be used.

That is, a magnetic recording medium is prepared by dispersing the above described ferromagnetic metal particles in an organic binder such as a copolymer of vinyl chloride and vinyl acetate, a copolymer of styrene and butadiene, epoxy resins or polyurethane resins and coating the thus prepared dispersion on a non-magnetic support.

When the above described ferromagnetic metal particles (hereinafter referred to as metal magnetic particles) are used, the magnetic recording medium using the magnetic metal particles is more suitable for higher density recording than that using oxide type magnetic particles. However, there is a defect in that the metal particles are more easily oxidized in the air than the oxide type magnetic particles. Therefore, when ferromagnetic metal particles are used in a magnetic recording medium, they are oxidized during storage, resulting in decreasing saturation magnetic flux density and in decreasing outputs. It is indispensable to granulate magnetic particles extremely finely to improve magnetic characteristics of a video tape. However, as the magnetic particles are granulated more finely, magnetic metal particles are more easily oxidized, resulting in largely decreasing the saturation magnetic flux density.

In this connection, it has been proposed to use magnetic metal particles stabilized by oxidation for a magnetic recording medium. The conventionally known methods for stabilizing magnetic metal particles by oxidation include a method of introducing oxygen-containing gas in an organic solvent and a method of gradually introducing oxygen-containing gas in an inert gas, as disclosed, for example, in Japanese Patent Publication No. 28961/81 and Japanese Patent Application (OPI) Nos. 69301/81 and 216306/86.

The ferromagnetic metal particles generally include iron particles and alloy particles of iron and another metal (e.g., Ti, V, Cr, Mn, Co, Ni, Cu, Zn, Si, Al, P, Mo, Sn, Sb, Ag and the like). These ferromagnetic metal particles are prepared by the following methods, which are well known in this industry.

(1) A method which comprises heat decomposing an organic acid salt of a ferromagnetic metal and reducing it with a reducing gas.

(2) A method which comprises reducing acicular oxyhydroxide, acicular oxyhydroxide containing metals or acicular iron oxide obtained by heating the oxyhydroxide in the presence of a reducing gas.

(3) A method of heat decomposing metal carbonyl compounds.

(4) A method of evaporating ferromagnetic metal in the presence of an inert gas under low pressure.

(5) A method of reducing metal salts capable of forming a ferromagnetic composition in an aqueous solution of the metal salts with a reducing substance such as boron hydride, hypophosphite or hydrazine.

(6) A method which comprises electrodepositing ferromagnetic metal particles using a mercury cathode and separating the ferromagnetic metal particles from mercury.

These metal particles obtained in accordance with the above methods are immediately oxidized when exposed to air, which is undesirable. Therefore, an oxidation method of gradually oxidizing the surface of a substance to form an oxide layer around the substance for stabilization is necessary. The gradual oxidation includes a method which comprises soaking the metal particles in an organic solvent under an inert gas and evaporating the solvent in air for drying and a method which comprises introducing a mixture of oxygen having a low oxygen partial pressure and an inert gas into the same inert gas, gradually increasing the oxygen partial pressure and finally introducing air. However, sufficiently oxidation-stabilized magnetic metal particles still cannot be obtained in accordance with the above methods.

Recently, higher image quality has been required for a magnetic recording medium. To realize the high image quality, it is necessary that a surface of the magnetic layer closely contact with the video head and the audio head. In this connection, not only surface smoothness of the magnetic recording medium but also removal of foreign substances is necessary. Most foreign substances are powders of the magnetic recording layer that have peeled apart from the support while the magnetic recording medium is being prepared or is running. To prevent the magnetic layer from peeling apart, it is necessary to strengthen the adhesive force between the magnetic layer and the support. On the other hand, as the surface smoothness of the magnetic layer increases, friction at running systems of the video tape recorder increases and running tension also increases. Under such harsh conditions, running durability is more and more demanded for the magnetic recording medium. In accordance with conventional methods, a magnetic recording medium having sufficient surface smoothness, good adhesiveness between the support and the magnetic layer and good running durability cannot be obtained.

Further, although gradual oxidation is carried out, sufficient stability for oxidation cannot be obtained, and particularly under conditions of high humidity and high temperature, demagnetization takes place. It is necessary to reduce the particle size in order to increase C/N. However, as the particle size of the ferromagnetic metal particles decreases, oxidation resistance decreases.

Accordingly, it is greatly desired to develop ferromagnetic metal particles having improved C/N and excellent oxidation stability under conditions of high temperature and high humidity.

In this connection, the inventors of the present invention studied the use of thermoplastic resins and thermosetting resins, the addition of binders which are crosslinked by chemical reaction, the use of binders which are hardened by crosslinking of electron ray exposure and the use of magnetic metal particles as magnetic particles to avoid the defects that the conventional magnetic recording medium have, and as a result of thorough investigations, the inventors of the present invention have attained the present invention.

SUMMARY OF THE INVENTION

One object of the present invention is to provide a magnetic recording medium having excellent running durability.

Another object of the present invention is to provide a magnetic recording medium using magnetic metal particles with excellent oxidation stability.

A further object of the present invention is to provide a magnetic recording medium having excellent electromagnetic properties.

Still another object of the present invention is to provide a magnetic recording medium which does not need a step of heat treatment for hardening a coated film.

The above described objects can be attained by the following invention.

That is, the present invention relates to a magnetic recording medium comprising a non-magnetic support having thereon a magnetic layer containing a binder which is crosslinkable or polymerizable by radiation exposure and ferromagnetic particles, the ferromagnetic particles being metal or metal alloy particles mainly comprising iron having a crystal size of 300Å or less, having a ratio of oxygen atoms to iron atoms of from 1.6 to 3.0 on the surface of the particles, and the magnetic layer having been irradiated with radiation.

Still further object of the present invention is to provide a magnetic recording medium using ferromagnetic metal particles, having improved C/N and reduced demagnetization at high temperature and high humidity.

As a result of various research, the present inventors found that the above objects can be attained by the following present invention.

The present invention relates to a magnetic recording medium comprising a nonmagnetic support having thereon a magnetic layer containing a binder comprising thermoplastic resins, thermosetting resins, reactive type resins and mixtures thereof and ferromagnetic particles, the ferromagnetic particles being metal or metal alloy particles mainly comprising iron having a crystal size of 250Å or less and having a ratio of oxygen atoms to iron atoms of from 1.6 to 3.0 on the surface of the particles.

DETAILED DESCRIPTION OF THE INVENTION

The present invention will hereinafter be illustrated in more detail.

The materials for a nonmagnetic support used in the present invention include polyesters such as polyethylene terephthalate or polyethylene 2,6-naphthalate; polyolefins such as polyethylene or polypropylene; cellulose derivatives such as cellulose triacetate; plastic films such as polycarbonate, polyimide, polyamideimide or vinyl type polymers; non-magnetic metals; and papers. The preferred material used in the present invention is polyethylene terephthalate.

The shape of a nonmagnetic support can be any one of a film, a sheet, a disk, a card and a tape and various materials are selected depending upon the shapes.

The support has a thickness of generally from 3 to 100 $\mu$m, preferably from 5 to 30 $\mu$m.

The support has a surface roughness (Ra) of generally 0.05 $\mu$m or lower, preferably 0.02 $\mu$m or lower, more preferably from 0.015 $\mu$m to 0.004 $\mu$m (Cut off value: 0.25 mm). The present invention effective particularly when the support has a surface roughness of 0.02 $\mu$m or lower.

The ferromagnetic particles used in the present invention include iron particles and alloy particles of iron with other metals (e.g., Ti, V, Cr, Mn, Co, Ni, Cu, Zn, Si, Al, P, Mo, Sn, Sb, Ag and the like). The ferromagnetic particles are prepared by the following methods, which are well known in the art.

(1) A method which comprises heat decomposing an organic acid salt of a ferromagnetic metal and reducing it with reducing gas.

(2) A method which comprises reducing acicular oxyhydroxide, acicular oxyhydroxide containing other metals, or acicular iron oxide obtained by heating the oxyhydroxide in the presence of a reducing gas.

(3) A method of heat decomposing metal carbonyl compounds.

(4) A method of evaporating ferromagnetic metal in the presence of an inert gas under low pressure.

(5) A method of reducing metal salts capable of forming a ferromagnetic composition in an aqueous solution of the metal salts with a reducing substance such as boron hydride, hypophosphite or hydrazine.

(6) A method which comprises electrodepositing ferromagnetic metal particles using a mercury cathode and separating the ferromagnetic metal particles from mercury.

The magnetic metal particles prepared by any one of the above methods can be used in the present invention and the method (2) is particularly preferred in view of both magnetic characteristics and manufacturing cost.

The binders which are capable of hardening with radiation exposure used in the magnetic layer of the present invention will be hereinafter illustrated in more detail.

The binders which are capable of hardening with radiation exposure used in the magnetic layer of the present invention will be hereinafter illustrated in more detail.

The binders which are capable of being hardened with radiation exposure used in the magnetic layer of the present invention are conventionally known radiation polymerizable compounds. Such compounds include, for example, polyvinyl chloride type resins having a polar group and a carbon-carbon unsaturated bond, cellulose type (meth)acrylate, urethane (meth)acrylate containing a polar group and vinyl type monomers and the like which are used alone or in combination.

The polyvinyl chloride type resins having a polar group and a carbon-carbon unsaturated bond (hereinafter both acrylate and methacrylate are referred to as (meth)acrylate and both an acryloyl group and a methacryloyl group are referred to as (meth)acryloyl group) include copolymers of the vinyl chloride and vinyl acetate type, copolymers of the vinyl chloride and vinyl propionate type and copolymers of the vinylidene chloride and vinyl acetate type having a polar group such as $CO_2H$, $OH$, $SO_3H$, $SO_3Na$, $OSO_3Na$, $OPO_3H_2$ or $OPO_3Na_2$ group.

The polar groups are preferably —$CO_2H$ and —$SO_3Na$, more preferably —$CO_2H$ group. When the polar group is a —$CO_2H$ group, the content of —$CO_2H$ is preferably from 1 to 30 in terms of acid values and more preferably from 3 to 20 in terms of acid values. When the content thereof is outside the above range, dispersibility of the ferromagnetic particles deteriorates and the electromagnetic characteristics are largely deteriorated.

An average content of carbon-carbon unsaturated bonds is from 1.5 to 20 and preferably from 2 to 10 per molecule. When the content thereof is outside the above ranges, the hardenable property becomes poor or the durability deteriorates.

The above described compounds include copolymers of the vinyl chloride type such as, for example, copolymers of vinyl chloride and vinyl acetate, copolymers of vinyl chloride, vinyl acetate and maleic acid, copolymers of vinyl chloride, vinyl acetate and vinyl alcohol, copolymers of vinyl chloride, vinyl acetate, maleic acid and vinyl alcohol, copolymers of vinyl chloride, vinyl propionate and vinyl maleate, copolymers of vinyl chloride, vinyl propionate and vinyl alcohol, copolymers of vinylidene chloride, vinyl acetate and maleic acid, copolymers of vinylidene chloride, vinyl propionate and vinyl alcohol, copolymers of vinyl chloride, vinyl acetate and acrylic acid and copolymers of vinyl chloride, vinyl acetate, acrylic acid and vinyl alcohol and saponified copolymers thereof.

The carbon-carbon unsaturated bond can be introduced by reacting a part of a hydroxyl group or a carboxyl group of the above described copolymer or a part of a hydroxyl group formed by saponification with one of the NCO groups of a polyfunctional isocyanate and reacting the remaining NCO groups with an active hydrogen compound having a (meth)acryloyl group, or by the method disclosed in Japanese Patent Application (OPI) No. 106605/86. Examples of polyfunctional isocyanates include, for example, 2,4-Tolylenediisocyanate, 2,6-tolylenediisocyanate, 1,3-xylylenediisocyanate, 1,4-xylylenediisocyanate, 1,5-napthalenediisocyanate, m-phenylenediisocyanate, p-phenylenediisocyanate, 3,3-dimethylphenylenediisocyante, 4,4-diphenylmethanediisocyanate, 3,3-dimethyl-4,4-diphenylmethanediisocyanate, hexamethylenediisocyanate, isophoronediisocyanate, dicyclohexylmethanediisocyanate and 3-adduct products of tolylenediisocyanate with trimethylolpropane. Examples of active hydrogen compounds having a (meth)acryloyl group include, for example, hydroxyalkyl (meth)acrylates such as acrylic acid, 2-hydroxyethyl acrylate, 2-hydroxypropyl acrylate, methacrylic acid, 2-hydroxyethyl methacrylate or 2-hydroxypropyl methacrylate; acrylamide; and N-methylolacrylamide.

A polar group can be introduced, for example, by reacting a part of a hydroxyl group or a carboxyl group of the above described copolymer or a part of a hydroxyl group formed by saponification with one of the NCO groups of a polyfunctional isocyanate, and reacting the remaining NCO groups with hydroxyl compounds having a $CO_2H$ group, an $SO_3Na$ group, a $OPO_3H_2$ group or a $OPO_3Na_2$ group. In this instance, compounds having both a polar group and a (meth)acryloyl group may be used. The method for introducing a polar group is not limited to the above described method.

The cellulose type (meth)acrylate as used in the present invention preferably includes resins in which an —OH group is modified by a (meth)acryloyl group, e.g., cellulose nitrate, cellulose acetate butyrate, cellulose acetate propionate and cellulose diacetate. The polymerization degree of the cellulose is generally from 50 to 400 and preferably from 80 to 200. When the polymerization degree exceeds the above range, the viscosity of the obtained magnetic coating solution becomes high and whereby the magnetic coating solution has a poor dispersibility, which is not preferable. Among those, in view of safety, cellulose acetate propionate and cellulose acetate butyrate are preferably used as a base of the cellulose.

For example, after the cellulose is reacted with polyisocyanate, the obtained compound is reacted with an active hydrogenation compound having a (meth)acryloyl group such as 2-hydroxymethyl acrylate, and then an —OH group in the resulting compound is modified by a (meth)acryloyl group to obtain the (meth)acrylate compound of the cellulose.

The urethane (meth)acrylate having a polar group as used in the present invention may have any one of a polyester, polyether and polyester ether as a main chain skeleton. Specific examples of the dibasic acid include oxalic acid, malonic acid, succinic acid, glutaric acid, adipic acid, sebacic acid, dodecanoic diacid, maleic acid, fumaric acid, itaconic acid, trimethyladipic acid, hexahydrophthalic acid, tetrahydrophthalic acid, phthalic acid, isophthalic acid, terephthalic acid and naphthaline dicarboxylic acid. Dihydric alcohols include ethylene glycol, trimethylene glycol, tetramethylene glycol, pentamethylene glycol, hexamethylene glycol, octamethylene glycol, diethylene glycol, triethylene glycol, tetraethylene glycol, 2,2-dimethylpropane-1,3-diol, 2,2-diethylpropane-1,3-diol, 2,2-diethylpropane-1,3-diol, cyclohexane-1,3-diol, cyclohexane-1,4- diol, cyclohexane-1,4-dimethanol, cyclohexane-1,3-dimethanol, 2,2-bis(4-hydroxyethoxycyclohexyl)propane, 2,2-bis(4-hydroxyethoxyphenyl)propane, and 2,2-bis(4-hydroxyethoxyethoxyphenyl)propane. It is also possible to use a polyester skeleton of a lactone type such as γ-butyrolactone, δ-valerolactone or ε-caprolactone. Isocyanates which form urethane bonds include polyhydric isocyanate such as 2,4-tolylenediisocyanate, 2,6-tolylenediisocyanate, 1,3-xylylenediisocyanate, 1,4-xylylenediisocyanate, 1,5-naphthalenediisocyanate, m-phenylenediisocyanate, p-phenylenediisocyanate, 3,3-dimethylphenylenediisocyanate, 4,4-diphenylmethanediisocyanate, 3,3-dimethyl-4,4-diphenylmethanediisocyanate, hexamethylenediisocyanate, isophoronediisocyanate, dicyclohexylmethanediisocyanate, or 3-adduct products of tolylenediisocyanate and trimethylolpropane. The above dibasic acids and dihydric alcohols may partially be replaced by tri- or polybasic acids and tri- or polyhydric alcohols. $CO_2H$ groups and acryloyl groups may be positioned at the terminal or at the side chain, of the polyurethane.

The above described groups can be introduced by the method (1) which comprises introducing an acid, an alcohol or at least one kind of isocyanate into a urethane skeleton and reacting the urethane having a residual $CO_2H$ group, OH group or NCO group at the side chain with a carboxylic acid compound or an acryloyl compound which is capable of reacting with the above described residual groups, or by the method (2) which comprises reacting urethane having an isocyanate group at the terminal which an active hydrogen compound having at least one $CO_2H$ group, OH group and an acryloyl group, respectively.

Urethane (meth)acrylate used in the present invention has an acid value of preferably from 1 to 30, more preferably from 3 to 20 most preferably from 5 to 15, and a molecular weight of generally from 1,000 to 100,000, preferably from 2,000 to 50,000, more preferably from 3,000 to 30,000. When the acid value is outside the above ranges, dispersibility of the ferromagnetic particles deteriorates, and the electromagnetic characteristics and durability also deteriorate. The average content of a (meth)acryloyl group is generally from 1.5 to 10, preferably from 2 to 8, per molecule.

When the molecular weight is less than 1,000, the magnetic layer of the magnetic recording medium becomes too strong and in many cases this results in problems such as crack developing and the magnetic recording medium curls due to the shrinkage occurring upon electron beam irradiation for hardening. When the molecular weight exceeds 100,000, the solubility of urethane (meth)acrylate to a solvent becomes poor, and not only handling thereof is difficult but also dispersibility of the magnetic composition is deteriorated and a huge amount of energy is needed for hardening, which is undesirable.

Vinyl type monomers may also be used in the present invention. The vinyl type monomers are compounds capable of being polymerized by radiation irradiation and compounds having at least a carbon-carbon unsaturated bond in a molecule. Examples thereof include acrylates, acrylamides, methacrylamides, methacrylates, allyl compounds, vinyl ethers, vinyl esters, vinyl heterocyclic compounds, N-vinyl compounds, styrenes, acrylic acid, methacrylic acid, crotonic acids, itaconic acids and olefins. Preferred compounds are those having two or more acryloyl groups or methacryloyl groups. Examples of these compounds include acrylates of polyethylene glycol such as diethylene glycol diacrylate, triethylene glycol diacrylate or tetraethylene glycol diacrylate; trimethylolpropane triacrylate, pentaerythritol tetraacrylate, dipentaerythritol pentaacrylate, dipentaerythritol pentaacrylate, dipentaerythritol hexaacrylate, diethylene glycol dimethacrylate, triethylene glycol dimethacrylate, tetraethylene glycol dimethacrylate, trimethylolpropane trimethacrylate, pentaerythritol tetramethylacrylate, tris(β-acryloyloxyethyl)isocyanurate, bis(β-acryloyloxyethyl)isocyanurate, reaction products of polyisocyanate (e.g., 2,4-tolylenediisocyanate, 2,6-tolylenediisocyanate, 1,3-xylylenediisocyanate, 1,4-xylylenediisocyanate, 1,5-naphthalenediisocyanate, m-phenylenediisocyanate, p-phenylenediisocyanate, 3,3-dimethylphenylenediisocyanate, 4,4-diphenylmethanediisocyanate, 3,3-dimethyl-4,4-diphenylmethanediisocyanate, hexamethylenediisocyanate, isophoronediisocyanate, dicyclohexylmethanediisocyanate, 3-adduct products of trimethylolpropane and tolylenediisocyanate) with a hydroxy acrylate compound (e.g., β-hydroxyethyl acrylate, β-hydroxypropyl acrylate and the like) and polyacrylates having di- or polyfunctions. These monomers may be used alone or in combinations.

When the binders capable of being hardened by radiation irradiation are used in the magnetic layer, the metal particles are undesirably oxidized immediately after they are exposed to air. Accordingly, an oxide layer is provided around the surface of particles for stabilization by a gradual oxidation treatment.

The gradual oxidation methods include a method of soaking metal particles in an organic solvent in an inert gas and thereafter evaporating the solvent for drying and a method of introducing a mixture of oxygen having a low oxygen partial pressure and an inert gas into the same inert gas, increasing the oxygen partial pressure gradually and finally introducing air.

However, the above gradation oxidation is insufficient to provide satisfactory stable resistance to oxidation, because even though gradation oxidation is conducted the atomic ratio of oxygen to iron (hereinafter referred to as "O/Fe atomic ratio") on the surface of a magnetic particle is less than 1.6 which is measured by Auger Electron Spectral Analysis.

However, there are the following methods to adjust the O/Fe atomic ratio of 1.6 or more. That is, (1) after gradual oxidation is conducted, the ferromagnetic particles are heated in an oxygen-containing gas. (2) When gradual oxidation is conducted using an organic solvent, the ferromagnetic particles are heated upon evaporating the solvent for drying. (3) When gradual oxidation is conducted without using an organic solvent, the ferromagnetic particles are heated upon gradually increasing the oxygen partial pressure. The heating (heat treatment) is carried out under the condition of a heating temperature of generally from room temperature to 200° C. and preferably from room temperature to 100° C., and in the presence of oxygen gas at a concentration of generally from 5 to 50 wt % and preferably from 2.0 to 10 wt %. Among these methods, (1) is the most preferred, because risky rapid oxidation hardly takes place upon heating the metal particle which is already subjected to gradual oxidation.

In the present invention, the atomic ratio of oxygen and iron atoms present on the surface of the ferromagnetic particles is a ratio of relative strength (as shown in FIG. 2) of $O_{KLL}$ peak (503 eV) and $Fe_{LMM}$ peak (703 eV) by Auger Electron Spectral Analysis, and is measured under the following conditions.

Measuring apparatus: Perkin-Elmer Co., Ltd. PHI Model 560
Electron beam accelerating voltage: 5 kv
Beam electric current: 1.0 μA
Degree of vacuum: $5.0 \times 10^{10}$ Torr The spectrum is obtained in the form of $N(E) \times E$ under the condition of 1 ev/step (the data are measured every 1 ev of electron energy) and 50 msec/step (in order to obtain 1 ev of electron energy, 50 msec of time is spent), and then carries out the smoothing in order to remove a noise and is subjected to the differential treatment every 11 ev of electron energy in order to emphasize a real signal.

In the case of using a binder capable of hardening by radiation irradiation, when the crystal size of the ferromagnetic particles is large, the noise level increases in all ranges, thereby decreasing C/N. It is necessary that the crystal size be 300Å or less to ensure sufficient C/N. The preferred crystal size is from 250Å and particularly 200Å or less.

The magnetic particles having the above crystal size can be obtained with reference to Ferrites, *Proceeding of the International Conference*, September to October, 1980, Japan (e.g., Shintaro Suzuki et al., *Reduction in Hydrogen of Iron Oxides to Produce the Metal Pigment Required for the Magnetic Recording Tapes*, Yasumichi Tokuoka et al., *The Formation of Iron Particles and Their Magnetic Properties*, Goro Akashi, *The Development of Metal Powder for Magnetic Recording*, and Shizuo Umemura et al., *Coercive Force of Iron Fine Powder Reduced from α-FeOOH*).

When a binder capable of hardening by radiation irradiation is used, organic solvents for dispersing and coating the magnetic coating composition include ketones such as acetone, methyl ethyl ketone, methyl isobutyl ketone or cyclohexanone; esters such as methyl acetate, ethyl acetate, butyl acetate, ethyl lactate or monoethyl ether of glycol acetate; alcohols; ethers such as ethyl ether, glycol dimethyl ether, glycol monoethyl ether, dioxane or tetrahydrofuran; aromatic hydrocarbon type solvents such as benzene, toluene, or xylene; and chlorinated hydrocarbon type solvents such as methylene chloride, ethylene chloride, carbon tetrachloride, chloroform, ethylene chlorohydrin or dichlorobenzene.

When a binder capable of hardening by radiation irradiation is used, additives such as lubricating agents, abrasive agents, dispersing agents, antistatic agents or anticorrosive agents may be added to the magnetic coating composition.

The lubricating agents include saturated and unsaturated higher fatty acids having 12 or more carbon atoms; fatty acid esters; higher fatty acid amides; higher alcohols; fluorocarbons; silicon oil such as polysiloxane; inorganic particles such as graphite or molybdenum disulfide; plastic particles such as polyethylene or polytetrafluoroethylene; mineral oil; vegetable oil; and fluorine compounds. These lubricating agents may be added upon preparing a magnetic coating composition, or may directly be coated or sprayed on the surface of a magnetic layer with or without dissolving lubricating agents in an organic solvent after radiation irradiation.

The lubricating agent is added in an amount of generally from 0.2 to 20 parts by weight and preferably from 0.5 to 10 parts by weight based on 100 parts by weight of total binder.

The abrasive agents are fine particles having an average particle size of from 0.05 to 5 μm and preferably from 0.1 to 2.0 μm, such as fused alumina, silicon carbide, chromium oxide ($Cr_2O_3$), corundum or diamond, and are added in an amount of generally from 0.5 to 20 parts by weight and preferably from 1.0 to 15 parts by weight, based on 100 parts by weight of ferromagnetic particles.

The magnetic coating composition of the present invention is prepared by a conventional method as disclosed, for example, in Japanese Patent Publication Nos. 11162/73, 21331/73, 33683/73, U.S. Pat. Nos. 3,240,621, 3,526,598, 3,728,262, 3,790,407 and 3,836,393.

Ferromagnetic particles and a binder are mixed in such a mixing ratio (parts by weight) that 8 to 25 parts (preferably 16 to 25 parts) of the binder (containing no lubricating agents, etc.) is added to 100 parts of the particles. The dry thickness of the magnetic layer is from 0.5 to 6 μm (preferably 0.8 to 4.8 μm).

When a radiation hardenable binder is used in the present invention, a backing layer may be provided on the surface of the support opposite the surface with the magnetic layer to prevent charging, print through and wow flutter, to improve the strength of the magnetic recording medium, and to make the surface of the backing layer matted.

A backing layer is a thin film layer composed of, for example, carbon black and inorganic filling particles having 5 or more Mohs' hardness dispersed in a binder, having a thickness of 0.6 μm or less, and can be prepared by a method as described in U.S. Pat. No. 4,582,757. Suitable binders include the above described binders polymerizable with radiation irradiation and the thermosetting binders.

Examples of binders used for a backing layer include copolymers of vinyl chloride type (e.g., copolymers of vinyl chloride and vinyl acetate; copolymers of vinyl chloride and vinyl acetate with a monomer such as vinyl alcohol, maleic anhydride or acrylic acid; copolymers of vinyl chloride and vinylidene chloride; copolymers of vinyl chloride and acrylonitrile; and copolymers of vinyl chloride having a polar group such as a sulfonic acid group), copolymers of ethylene and vinyl acetate, cellulose derivatives such as nitrocellulose resins, acrylic resins, polyvinyl acetal resins, polyvinyl butyral resins, epoxy resins, phenoxy resins, polyurethane type resins (e.g., general polyurethane resins, polyester polyurethane resins, polyurethane resins having a polar group such as a sulfonic acid group, and polycarbonate polyurethane resins). Resins may be used alone, and generally at least two kinds of resins such as the combination of vinyl chloride type resins and polyurethane type resins or the combination of cellulose derivatives and polyurethane type resins are used.

In a magnetic recording medium comprising a nonmagnetic support having provided on one surface thereof a magnetic layer and on the other surface thereof a backing layer, the physical properties of the magnetic layer and the backing layer are strengthened, Young's modulus increases, and Tg (glass transition temperature) increases, but on the other hand, adhesion of the support with a magnetic layer and a backing layer deteriorates due to surface smoothness of the non-magnetic support and running durability becomes poor, resulting in dropouts and bridging of the magnetic head gap. To solve the above problems, approaches have been taken to maintain adhesion, that is, an undercoated layer is provided on the nonmagnetic support, or surface modified treatment such as electron beam irradiation or corona discharge is provided on the surface of the non-magnetic support.

The present invention using a radiation hardenable binder is effective on the magnetic recording medium comprising a nonmagnetic support having provided on both surfaces thereof a magnetic layer.

After a magnetic layer is provided, it is dried while the magnetic layer is being subjected to magnetic orientation, if desired. Thereafter, the magnetic layer is subjected to surface smoothing treatment using a supercalendering and is subjected to radiation irradiation and is slit to a predetermined width.

In the present invention using a radiation hardenable binder, the magnetic layer thus coated with a magnetic coating composition is subjected to calendering treatment and then is subjected to radiation irradiation, and the calendering treatment may be provided after radiation irradiation or radiation irradiation may further be provided before and after the calendering treatment.

Radiation irradiated to the magnetic layer of the present invention using a radiation hardenable binder includes electron beams, $\gamma$-ray, $\beta$-ray and ultraviolet rays, and electron beams are preferred. A scanning method, a double scanning method, a curtain beam method or a broad beam curtain method can be used for accelerating the electron beams.

Regarding electron beams, the accelerating voltage is from 100 to 1,000 kv and preferably from 150 to 300 kv, and the absorption dose is generally from 1 to 20 Mrad and preferably from 3 to 15 Mrad. When the accelerating voltage is 100 kv or less, the transmitted amount of energy is short and when it exceeds 1,000 kv, energy efficiency used for polymerization decreases and is uneconomical. When the absorption dose is 1 Mrad or less, the hardening reaction is insufficient and a desired strength of the magnetic layer cannot be obtained. When it is 20 Mrad or more, energy efficiency for hardening decreases, or the irradiated object generates heat, and particularly a plastic support deforms, which is undesirable.

When a conventional thermoplastic resin, thermosetting resin or reactive type resin is used as a binder, in order to assure a preferred C/N of a magnetic recording medium using ferromagnetic metal particles, it is necessary that the particle size (crystal size) of the magnetic particles is 250Å or less. However, the ferromagnetic metal particles having such a small size have heavy demagnetization particularly at high temperature and high humidity. In this connection, the inventors found that such heavy demagnetization at high temperature and at high humidity can be prevented by providing an oxidation treatment so that atomic ratio of oxygen to iron (hereinafter referred to as "O/Fe atomic ratio") on the surface of the ferromagnetic metal particles is adjusted to from 1.6 to 3.0, and thus developed the present invention.

As described above, the Fe/O atomic ratio is less than 1.6 on the surface of magnetic particles only by providing conventional gradual oxidation, and accordingly demagnetization cannot be prevented at high temperature and high humidity. In this connection, among the methods (1) to (3) described in the case of using a radiation hardenable binder the method (1) is preferably employed to adjust the Fe/O atomic ratio to 1.6 to 3.0.

When ferromagnetic particles have a large crystal size, the noise level increases at all ranges, thereby unpreferably decreasing the C/N ratio. It is necessary that ferromagnetic particles have a crystal size of 250Å or less and preferably 200Å or less to ensure sufficient C/N ratio.

Suitable binders used in this embodiment of the present invention include conventional thermoplastic resins, thermosetting resins, reactive type resins and mixtures thereof.

The thermoplastic resins are those having a softening point (temperature) of 150° C. or less, an average molecular weight of from 10,000 to 100,000 and a degree of polymerization of from about 100 to 1,000 such as, for example, copolymers of vinyl chloride and vinyl acetate, copolymers of vinyl chloride and vinylidene chloride, copolymers of vinyl chloride and acrylonitrile, copolymers of acrylic acid ester and acrylonitrile, copolymers of acrylic acid ester and vinylidene chloride, copolymers of acrylic acid ester and styrene, copolymers of methacrylic acid ester and acrylonitrile, copolymers of methacrylic acid ester and vinylidene chloride, copolymers of methacrylic acid ester and styrene, urethane elastomer, copolymers of vinylidene chloride and acrylonitrile, polyvinyl chloride, copolymers of butadiene and acrylonitrile, polyamide resins, polyvinyl butyral, cellulose derivatives (e.g., cellulose acetate butyrate, cellulose diacetate, cellulose triacetate, cellulose propionate, nitrocellulose and the like), copolymers of styrene and butadiene, polyester resins, various kinds of synthetic rubber type thermoplastic resins (e.g., polybutadiene, polychlorobutyrene, polyisoprene, copolymers of styrene and butadiene and the like) or mixtures thereof.

The thermosetting resins or reactive type resins have a molecular weight of 200,000 or less and preferably from 500 to 120,000 when they are in a coating composition. After they are coated and dried, the molecular weight thereof becomes infinite by the condensation and adduction reaction and the like. Those resins that do not soften or melt until the resins are heat decomposed are preferred. Specific examples of such resins include, for example, phenol.formalin-novolak resins, phenol.formalin-resol resins, phenol.furfural resins, xylene.formaldehyde resins, urea resins, melamine resins, dry oil modified alkyd resins, phenolic acid resin modified alkyd resins, maleic acid resin modified alkyd resins, unsaturated polyester resins, epoxy resins and hardening agents (e.g., polyamine, acid anhydride, polyamide resins and the like), polyester moisture hardenable resins having isocyanate at the terminal, polyether moisture hardenable resins having isocyanate at the terminal, polyisocyanate prepolymer (a compound having at least three isocyanates in a molecule obtained by reacting diisocyanate with low molecular tolyol, trimers and tetramers of diisocyanate), resins having polyisocyanate prepolymers and active hydrogen (e.g., polyester polyol, polyether polyol, copolymers of acrylic acid, copolymers of maleic acid, copolymers of 2-hydroxyethyl methacrylate, copolymers of parahydroxystyrene and the like) and mixtures thereof.

The same additives as those used when the radiation hardenable binders are used can be added in the same amount as in the case of using a radiation hardenable binder to the magnetic coating composition using the conventional thermoplastic resins, thermosetting resins or reactive type resins. The method for preparing a magnetic coating composition is the same as that using a radiation hardenable binder. A backing layer may be provided in the same manner as in the case of using a radiation hardenable binder.

The magnetic layer thus provided on a support is subjected to orientation, dried and may be subjected to a smoothing treatment (e.g., smoothing treatment before drying or calendering treatment after drying) to increase magnetic characteristics such as S/N in the same manner as in the case of using a radiation hardenable binder.

EXAMPLE

The present invention will be illustrated in more detail by the following Examples and Comparative Examples. In the Examples and Comparative Examples, all parts are by weight unless otherwise specified.

EXAMPLE I (cases when radiation hardenable binder is used)

EXAMPLE I-1

Acicular $\alpha$-FeOOH (length: 0.4 $\mu$m, acicular ratio: 15) containing Ni in an amount of 5 atm % and coated with Si in an amount of 4 atm % was heated and dehydrated in nitrogen flow gas at 520° C. to prepare acicular $\alpha$-Fe$_2$O$_3$ particles, which was then reduced in hydrogen flow gas at 480° C. for 5 hours to obtain magnetic metal particles.

The magnetic metal particles were soaked in toluene without being exposed to air, toluene was then evaporated in air, and the magnetic metal particles were heated at 40° C. in air for 5 hours to obtain magnetic metal particles which were stable in air. These particles were identified as magnetic metal particles 1.

EXAMPLE I-2

Acicular $\alpha$-FeOOH (length: 0.6 $\mu$m, acicular ratio: 20) containing Zn in an amount of 3 atm % and coated with Al in an amount of 3 atm % was heated and dehydrated in nitrogen flow gas at 500° C. to prepare acicular $\alpha$-Fe$_2$O$_3$ particles, which were then reduced in hydrogen flow gas at 450° C. for 6 hours to obtain magnetic metal particles.

After reduction, the inside of the vessel was replaced with nitrogen and cooled to room temperature, and oxygen gas was gradually introduced into nitrogen gas to increase the oxygen concentration so that finally the oxygen concentration became the same as the oxygen concentration in air for 6 hours and magnetic metal particles which were stable in air were obtained.

These particles were heated at 50° C. in air for 2 hours. These particles were identified as magnetic metal particles 2.

EXAMPLE I-3

Acicular $\alpha$-FeOOH (length: 0.8 $\mu$m, acicular ratio: 20) containing Ni in an amount of 5 atm % and coated with Si in an amount of 2 atm % was heated and dehydrated in nitrogen flow gas at 500° C. to prepare acicular $\alpha$-Fe$_2$O$_3$ particles, which were then reduced in hydrogen flow gas at 440° C. for 6 hours to obtain magnetic metal particles.

After reduction, the inside of the vessel was replaced with nitrogen and cooled to room temperature, and oxygen gas was gradually introduced into nitrogen gas to increase the oxygen concentration so that finally the oxygen concentration became the same as the oxygen concentration in air for 6 hours and magnetic metal particles which were stable in air were obtained.

These particles were heated at 40° C. in air for 4 hours, and were identified as magnetic metal particles 3.

COMPARATIVE EXAMPLE I-1

Acicular $\alpha$-FeOOH (length: 0.4 $\mu$m, acicular ratio: 20) containing Ni in an amount of 5 atm % and coated with Si in an amount of 4 atm % was heated and dehydrated in nitrogen flow gas at 500° C. to prepare acicular $\alpha$-Fe$_2$O$_3$ particles, which were then reduced in hydrogen flow gas at 470° C. for 6 hours to obtain magnetic metal particles.

The magnetic metal particles were soaked in toluene without being exposed to air, toluene was evaporated in air and magnetic metal particles which were stable in air were obtained and identified as magnetic metal particles 4.

COMPARATIVE EXAMPLE I-2

Acicular $\alpha$-FeOOH (length: 0.8 $\mu$m, acicular ratio: 20) containing Ni in an amount of 5 atm % and coated with Si in an amount of 2 atm % was heated and dehydrated in nitrogen flow gas at 500° C. to prepare acicular $\alpha$-Fe$_2$O$_3$ particles, which was then reduced in hydrogen flow gas at 440° C. for 6 hours to obtain magnetic metal particles. The magnetic metal particles were soaked in toluene without being exposed to air, toluene was evaporated in air, and the magnetic metal particles which were stable in air were obtained and identified as magnetic metal particles 5.

Preparation of a Magnetic Tape

Magnetic tapes were prepared using the above magnetic metal particles (1 to 5) in the following manner.

| Magnetic Coating Composition: | parts |
| --- | --- |
| Magnetic metal particles | 100 |
| Acrylate of vinyl chloride copolymer type (acid value: 3, molecular weight: 20,000, average number of acryloyl group: 2.8/molecule) | 10 |
| Urethane acrylate (acid value: 1.8, molecular weight: 10,000, average number of acryloyl group: 3/molecule) | 6 |
| Trimethylolpropane triacrylate | 4 |
| Stearic acid | 2 |
| Butyl stearate | 2 |
| $\alpha$-Al$_2$O$_3$ particles | 4 |
| Carbon black | 1 |
| Methyl ethyl ketone | 800 |

A polyethylene terephthalate support having a 10 $\mu$m thickness and having a surface roughness (Ra) of 0.008 $\mu$ (cut off value: 25 mm) was treated with electron beam irradiation using Curetron ® manufactured by Nisshin High Voltage Co., Ltd., at an accelerating voltage of 200 kv, in an exposure dose of 5 Mrads at an atmosphere of 30° C., at an O$_2$ concentration of 150 ppm (O$_2$ was purged by N$_2$ gas), at an exposure rate of 80 m/min.

A magnetic coating composition was coated on the polyethylene terephthalate support which was made hydrophilic by electron beam irradiation on the irradiated surface at a coating rate of 80 m/min in a dry thickness of 3.0 $\mu$m.

The nonmagnetic support thus coated with the magnetic coating composition was provided with the magnetic orientation treatment using magnets of 3,000 gauss while the magnetic coating composition was undried. After drying, the support was subjected to supercalendering treatment and electron beam irradiation and was slit to 8 mm width to prepare 8 mm video tape. The electron beam irradiation was conducted at an accelerating voltage of 200 kv, an irradiated dose of 5 Mrads at the atmosphere of 70° C., at an O₂ concentration of 10 ppm, and at an exposure rate of 80 m/min. The results of evaluation on the tapes are shown in Table 1.

TABLE 1

| Example No. | O/Fe Measured by AES (atomic ratio) | Crystal Size (Å) | $\sigma s$ (emu/g) | $\Delta\sigma s$ (%) | Bm (Gauss) | $\Delta Bm$ (%) | C/N Ratio (dB) | Number of D.O. per 1min. | Number of Passes until Bridging of the Magnetic Head Gap (head clogging) Occurs |
|---|---|---|---|---|---|---|---|---|---|
| Example I-1 | 1.7 | 185 | 122 | 22 | 3,500 | 4.5 | +3.6 | 10 | 100 or more |
| Example I-2 | 2.6 | 230 | 135 | 13 | 3,650 | 2.4 | +3.0 | 12 | 100 or more |
| Example I-3 | 1.9 | 270 | 140 | 17 | 3,760 | 4.0 | +1.1 | 8 | 100 or more |
| Comparative Example I-1 | 1.4 | 180 | 123 | 37 | 3,500 | 18.0 | +2.5 | 30 | 40 |
| Comparative Example I-2 | 1.2 | 265 | 142 | 31 | 3.750 | 14.9 | 0 | 20 | 80 |

Method for measuring O/Fe atomic ratio:
Strength ratio (relative value) of O/Fe measured by Auger Electron Spectral Analysis (AES) on the surface: The relative strength ratio of $O_{KKL}$ peak (at 503 eV) and $Fe_{LMM}$ peak (at 703 eV) was found.

Conditions for Measurement

"PHI 560" manufactured by PERKIN-ELMER Co., Ltd. was used.
Electron beam accelerating voltage: 5 kv
Beam electric current: 1.0 μA
Vacuum degree: $5 \times 10^{-10}$ Torr The spectrum was obtained in the form of $N(E) \times E$ under the condition of 1 ev/step (the data were measured every 1 ev of electron energy) and 50 msec/step (in order to obtain 1 ev of electron energy, 50 msec of time was spent), and then carried out the smoothing in order to remove a noise and was subjected to the differential treatment every 11 ev of electron energy in order to emphasize a real signal.

Crystal size: The crystal size is calculated by a half breadth of a diffraction peak for the (111) plane (α-Fe plane) and the (220) plane measured by an X-ray diffraction device $\Delta\sigma s$: The degree of change of σs (saturation magnetization) before and after magnetic particles were allowed to stand at 60° C. and 90% RH for 1 week was calculated from the following equation.

$$\Delta\sigma s = \left( \frac{\text{initial } \sigma s - \sigma s \text{ after 1 week}}{\text{initial } \sigma s} \right) \times 100 \; (\%)$$

$\Delta Bm$: The degree of change of Bm (saturation magnetic flux density) before and after a magnetic tape was allowed to stand at 60° C. and 90% RH for 1 week was calculated by the following equation.

$$\Delta Bm = \left( \frac{\text{initial } Bm - Bm \text{ after 1 week}}{\text{initial } Bm} \right) \times 100 \; (\%)$$

Number of Dropouts

Using a commercially available 8 mm video tape recorder (Fujix-8), the number of dropouts where outputs decreased by 10 dB or more for $15 \times 10^{-6}$ sec per 1 minute, was counted, after a tape made running on the deck for 100 passes, by a dropout counter DV-3D manufactured by Victor Co., Ltd.

Number of Passes until Bridging of the Magnetic Head Gap (head clogging) Occurs Using a commercially available 8 mm video tape recorder "Fujix-8", tapes made running at a normal speed and the number of passes until bridging of the magnetic head gap occurs was counted.

C/N Ratio

Using a commercially available 8 mm video tape recorder "Fujix-8", signals at 5 MHz were recorded and noise occurring at $5 \pm 1$ MHz was measured when these signals were reproduced. The ratio of reproduced signals to noise was measured. Noise was measured by an output level measuring device "NV-870HD type", manufactured by Matsushita Electric Industrial Co., Ltd. C/N ratios are shown by relative values when the ratio in Comparative Example I-2 was 0 dB.

As is clear from the results of Table 1, the magnetic recording medium of the present invention is very excellent in storage stability, running durability and electromagnetic properties.

EXAMPLE II (cases when conventional thermoplastic, thermosetting or reactive type resins are used)

EXAMPLE II-1

Acicular α-FeOOH (length: 0.4 μm, acicular ratio: 20) containing Ni in an amount of 5 atm % and coated with Si in an amount of 4 atm % was heated and dehydrated in nitrogen flow gas at 500° C. to prepare acicular α-Fe₂O₃ particles, which was then reduced in hydrogen flow gas at 470° C. for 6 hours to obtain magnetic metal particles.

The magnetic metal particles were soaked in toluene without being exposed to air, toluene was evaporated in air, and the magnetic metal particles were heated at 40° C. in air for 4 hours, cooled to room temperature and was kept for 3 hours by increasing O₂ concentration to 30 wt % to obtain ferromagnetic metal particles which were stable in air. These particles were identified as magnetic metal particle 6.

EXAMPLE II-2

Acicular α-FeOOH (length: 0.6 μm, acicular ratio: 20) containing Zn in an amount of 3 atm % and coated with Al in an amount of 3 atom % was heated and dehydrated in nitrogen flow gas at 500° C. to prepare acicular α-Fe₂O₃ particles, which was then reduced in hydrogen gas at 440° C. for 6 hours to obtain magnetic metal particles.

After reducing, the inside of the vessel was replaced with nitrogen and cooled to room temperature, and oxygen gas was gradually introduced into nitrogen gas to increase oxygen concentration so that finally the oxygen concentration became the same as the oxygen concentration in air for 6 hours and magnetic metal particles which were stable in air were obtained and were heated in air at 50° C. for 2 hours. These particles were identified as magnetic metal particles 7.

COMPARATIVE EXAMPLE II-1

Acicular α-FeOOH (length: 0.8 μm, acicular ratio: 20) containing Ni in an amount of 5 atm % and coated with Si in an amount of 2 atm % was heated and dehydrated in nitrogen flow gas at 500° C. to prepare acicular α-Fe$_2$O$_3$ particles, which were reduced in hydrogen flow gas at 440° C. for 6 hours to obtain magnetic metal particles.

After reduction, the inside of the vessel was replaced with nitrogen and cooled to room temperature, and oxygen gas was gradually introduced into nitrogen gas to increase the oxygen concentration so that finally the oxygen concentration became the same as the oxygen concentration in air, and ferromagnetic metal particles which were stable in air were obtained, and then heated in air at 40° C. for 4 hours. These particles were identified as magnetic metal particles 8.

COMPARATIVE EXAMPLE II-2

Acicular α-FeOOH (length: 0.4 μm, acicular ratio: 20) containing Ni in an amount of 5 atm % and coated with Si in an amount of 7 atm % was heated and dehydrated in nitrogen gas flow at 500° C. to prepare acicular α-Fe$_2$O$_3$ particles, which were then reduced in hydrogen flow gas at 470° C. for 6 hours to obtain magnetic metal particles.

The magnetic metal particles were soaked in toluene without being exposed to air, toluene was evaporated in air, and the magnetic metal particles which were stable in air were obtained. These particles were identified as magnetic metal particles 9.

Preparation of a Magnetic Tape

Magnetic tapes were prepared using the above magnetic metal particles 6 to 9 in the following manner.

| Magnetic Coating composition: | parts by weight |
|---|---|
| Magnetic metal particles | 100 |
| Copolymer of vinyl chloride (*1) | 12 |
| Polyurethane resin (*2) | 8 |
| α-Al$_2$O$_3$ particles | 5 |
| Stearic acid | 2 |
| Butyl stearate | 2 |
| Methyl ethyl ketone | 125 |
| Toluene | 125 |

The above composition was mixed, kneaded and dispersed using a ball mill for 48 hours, 8 parts of polyisocyanate compound ("Desmodule L", manufactured by Bayer Co., Ltd.) was added thereto, then mixed, kneaded and dispersed for 1 hour, and filtered by a filter having an average pore diameter of 1 μm to prepare a magnetic coating composition. The thus prepared magnetic coating composition was coated on a polyethylene terephthalate support having a thickness of 10 μm in a dry thickness of 4.0 μm using a reverse roll.

The nonmagnetic support thus coated with a magnetic coating composition was subjected to magnetic orientation using magnets at 3,000 gauss while the coating composition was undried, dried and was subjected to supercalendering and was slit to 8 mm width to prepare an 8 mm video tape. The results of evaluation on a tape are shown in Table 2.

The above described copolymer of vinyl chloride (*1) and polyurethane resin (*2) were prepared in the following manner.

Vinyl Chloride Type Copolymer (*1)

Distilled water (300 ml) containing 0.6 g of polyvinyl alcohol dissolved therein, in which a carbon dioxide gas in the distilled water was removed from the distilled water by a nitrogen gas, azobisisobutyronitrile (0.15 g), glycidyl methacrylate (16.6 g) and sodium 2-acrylamide-2-methylpropane sulfonate (8.0 g) were introduced into an autoclave of 500 ml made of stainless steel and equipped with an electromagnetic induction stirring device and a pressure gauge, a lid was placed thereon and the autoclave was cooled in a dry ice.methanol vessel until the inside of the autoclave became −20° C.

Then, nitrogen gas was introduced into the autoclave to replace the inside gas with nitrogen gas, 100 g of cooled liquid polyvinyl chloride was promptly added thereto and stirred for about 15 minutes, raising the temperature to 60° C. to conduct polymerization.

The reaction was continued until the components to be reacted were consumed and the pressure decreased in the autoclave.

After the pressure decreased, the autoclave was cooled to room temperature and nitrogen was introduced to remove vinyl chloride remaining in the autoclave. Then the resulting product was taken out therefrom, washed with water sufficiently and filtered to obtain a white powder of polymerized substance.

As a result of elemental analysis on the white powder, it was found that the white powder was a copolymer of vinyl chloride type composed of vinyl chloride, sodium 2-acrylamide-2-methylpropane sulfonate and glycidyl methacrylate in a molar ratio of 87.5/2.5/10.

The limiting viscosity (η) of the copolymer measured with methyl ethyl ketone was 0.21.

Polyurethane Type Resin (*2)

582 g of dimethyl terephthalate, 157 g of dimethyl 5-sodium sulfoisophthalate, 434 g of ethylene glycol, 728 g of neopentyl glycol, 0.66 g of zinc acetate and 0.08 g of sodium acetate were introduced into a reaction vessel equipped with a thermometer, stirring device and a partially refluxing cooling device, reacted at from 140° C. to 220° C. for 2 hours, and then 1,212 g of sebacic acid was added thereto and reacted for 2 hours. The pressure of the reaction system was reduced to 20 mm Hg for 30 minutes and a polymerization reaction was conducted under from 5 to 20 mm Hg, at 250° C. for 5 minutes to prepare a polyester polyol.

The thus obtained polyester polyol was found to be composed of terephthalic acid, dimethyl 5-sodium sulfoisophthalate, sebacic acid, ethylene glycol and neopentyl glycol in a molar ratio of 15.3/2.9/30.7/22.5/28.6.

1,000 g of the above polyester polyol, 1,280 g of toluene, 850 g of methyl isobutyl ketone, 71 g of diphenylmethanediisocyanate and 1.2 g of dibutyl tin dilaurate were introduced into a reaction vessel equipped with a thermometer, a stirring device and a refluxing type cooler and reacted at from 70° to 90° C.

for 8 hours. In the thus obtained polyurethane type resins, 0.25 mol % of dimethyl 5-sodium sulfoisophthalate was polymerized.

TABLE 2

| Example No. | O/Fe Measured by AES (atomic ratio) | Crystal Size (Å) | ΔBm (%) | σs (emu/g) | Δσs (%) | C/N Ratio (dB) |
|---|---|---|---|---|---|---|
| Example II-1 | 1.7 | 185 | 4.3 | 122 | 22 | +2.4 |
| Example II-2 | 2.3 | 230 | 2.1 | 135 | 13 | +1.4 |
| Comparative Example II-1 | 1.7 | 270 | 4.0 | 140 | 17 | 0 |
| Comparative Example II-2 | 1.4 | 180 | 12.3 | 123 | 37 | +2.3 |

Measurement Method

Crystal size: The crystal size was calculated in the same manner as in Example I.
Δσs: Calculated in the same manner as in Example I.
ΔBm: Calculated in the same manner as in Example I.
O/Fe: Measured by the same manner as in Example I.

C/N Ratio

Using a commercially available 8 mm video tape recorder "Fujix-8", signals at 5 MHz were recorded and noise occurring at the range of $5\pm1$ MHz was measured when these signals were reproduced. The ratio of reproduced signals to noise was measured. Noise was measured by an output level measuring device "NV-870HD Type", manufactured by Matsushita Electric Industrial Co., Ltd. C/N ratio is shown by a relative value when the ratio in Comparative Example II-1 was 0 dB.

As is clear from the above results of Table 2, samples of the present invention have high C/N and the change (decrease) of σs and Bm at high temperature and high humidity is extremely slight, and accordingly oxidation stability is extremely excellent.

In the case when the atomic ratio of O/Fe falls within the range of the present invention, when the crystal size is large, C/N is low. In the case when the crystal size falls within the range of the present invention, when the atomic ratio of O/Fe is too low, the change of σs and Bm at high temperature and humidity is large, and accordingly, oxidation stability is poor.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having thereon a magnetic layer containing a binder which is crosslinkable or polymerizable by radiation irradiation and ferromagnetic particles, said ferromagnetic particles being metal or metal alloy particles mainly comprising iron having a crystal size of 300Å or less, having an atomic ratio of oxygen atoms to iron atoms of from 1.6 to 3.0 on the surface of said particles, and said magnetic layer having been irradiated with radiation.

2. A magnetic recording medium comprising a nonmagnetic support having thereon, a magnetic layer containing a binder comprising at least one of thermoplastic resins, thermosetting resins, reactive type resins and mixtures thereof and ferromagnetic particles, said ferromagnetic particles being metal or metal alloy particles mainly comprising iron having a crystal size of 250Å or less, and having an atomic ratio of oxygen atoms to iron atoms of from 1.6 to 3.0 on the surface of said particles.

3. The magnetic recording medium as claimed in claim 1, wherein the ferromagnetic particles being metal or metal alloy particles are formed by heating the ferromagnetic particles at a temperature of from room temperature to 200° C. and in the presence of oxygen gas at a concentration of from 5 to 50 wt %.

4. The magnetic recording medium as claimed in claim 2, wherein the ferromagnetic particles being metal or metal alloy particles are formed by heating the ferromagnetic particles at a temperature of from room temperature to 200° C. and in the presence of oxygen gas at a concentration of from 5 to 50 wt %.

5. The magnetic recording medium as claimed in claim 1, wherein the binder is at least one compound selected from polyvinyl chloride resins having a polar group and a carbon-carbon unsaturated bond, cellulose (meth)acrylate, urethane (meth)acrylate containing a polar group and vinyl monomers.

* * * * *